United States Patent [19]
Kojima et al.

[11] Patent Number: 6,007,152
[45] Date of Patent: Dec. 28, 1999

[54] SEAT RECLINING MECHANISM FOR VEHICLES

[75] Inventors: Yasuhiro Kojima, Kariya; Yukifumi Yamada, Toyota; Tadasu Yoshida, Kariya, all of Japan

[73] Assignee: Aisin Seiki Kabushiki Kaisha, Kariya, Japan

[21] Appl. No.: 09/201,654

[22] Filed: Dec. 1, 1998

[30] Foreign Application Priority Data

Dec. 2, 1997 [JP] Japan .................................... 9-332082

[51] Int. Cl.⁶ ........................................................ B60N 2/02
[52] U.S. Cl. ............................................................ 297/367
[58] Field of Search .................................. 297/367, 366, 297/368, 369, 378.12

[56] References Cited

U.S. PATENT DOCUMENTS

| | | | |
|---|---|---|---|
| 4,087,885 | 5/1978 | Gillentine | 297/367 X |
| 4,659,146 | 4/1987 | Janiaud | |
| 5,590,931 | 1/1997 | Fourrey et al. | |
| 5,622,407 | 4/1997 | Yamada et al. | 297/367 X |
| 5,762,400 | 6/1998 | Okazaki et al. | 297/367 |
| 5,829,830 | 11/1998 | Maloney | 297/219.12 X |
| 5,873,630 | 2/1999 | Yoshida et al. | 297/367 |

FOREIGN PATENT DOCUMENTS 2 547 778  12/1984  France .
2-128707   5/1990   Japan .

*Primary Examiner*—Peter R. Brown
*Attorney, Agent, or Firm*—Burns, Doane, Swecker & Mathis, LLP

[57] ABSTRACT

A pawl and a ratchet are more firmly engaged with each other. A seat reclining mechanism has a cam surface formed in a lower arm and brought into contact with one of pawls so as to move a cam in a radial direction and press the other pawls in an engaging direction with the ratchet.

9 Claims, 5 Drawing Sheets

SEAT RECLINING MECHANISM FOR VEHICLES

BACKGROUND OF THE INVENTION

The present invention relates to a seat reclining mechanism for vehicles, and more particularly to a seat reclining mechanism for supporting a seat back in such a manner as to freely adjust an inclination angle of the seat back with respect to a seat cushion.

A conventional seat reclining mechanism has been for example shown in the Japanese Patent Laid-Open Publication No. 2-128707 (1990). This has a lower arm held to a seat cushion frame, an upper arm rotatably supported to the lower arm and held to a seat back frame, a rotational shaft rotatably supported to the lower arm and inserted into a hole formed on the upper arm so as to provide a rotation center of the upper arm with respect to the lower arm, a lock mechanism comprising a ratchet and a plurality of pawls which are arranged in a space between the lower arm and the upper arm and adapted to be engaged with each other so as to restrict a rotation of the upper arm with respect to the lower arm when the upper arm is to be secured to the lower arm, and a cam supported to the rotation shaft in such a manner as to be integrally rotated and press an inner surface of the pawls so as to engage the pawls with the ratchet.

Further, in this conventional mechanism, a diameter of a through hole of the cam to which the rotation shaft is inserted is greater than a diameter of the rotation shaft, and the cam freely move with respect to the rotation shaft in a radial direction, so that the pawls are certainly pressed so as to engage all the pawls with the ratchet due to a movement of the cam with respect to the rotation shaft in a radial direction.

However, in the former conventional mechanism mentioned above, although a certain engagement between all the pawls and the ratchet is secured by adjusting the position of the cam with respect to the pawls, the pressing force of the cam to the pawls tends to be relatively low due to this adjustment, so that there is a fear that all the pawls are not always firmly engaged with the ratchet. Accordingly, there has been a fear that a backlash in a rotating direction is generated in an engagement between the pawls and the ratchet, and there has been also a fear that a rotation restriction of the upper arm with respect to the lower arm by the lock mechanism is insufficient.

SUMMARY OF THE INVENTION

Accordingly, a primary object of the present invention is to make an engagement between pawls and a ratchet more firm.

In order to achieve the primary object mentioned above, in accordance with the invention, there is provided technical means which is structured such as to have a cam member surface formed in the lower arm and brought into contact with one of the pawls and to move the cam member in a radial direction so as to press the others of the pawls in a direction of engaging with the ratchet.

In accordance with this technical means, the cam member is pressed and moved due to a reaction force caused by the contact between one pawl and the cam surface. Accordingly, the engagement between the other pawls and the ratchet is made firm, and the engagement between the pawls brought into contact with the cam surface through the upper arm and the ratchet is made firm.

More preferably, the structure may further comprises a support portion having first opposed flat surfaces formed in the rotation shaft and extending toward the cam surface and supporting the cam member, and a through hole having second opposed flat surfaces formed in the cam member and being slidably contact with the first surfaces and to which the rotation shaft is inserted.

DESCRIPTION OF THE PREFERRED EMBODIMENT

Figure 1:
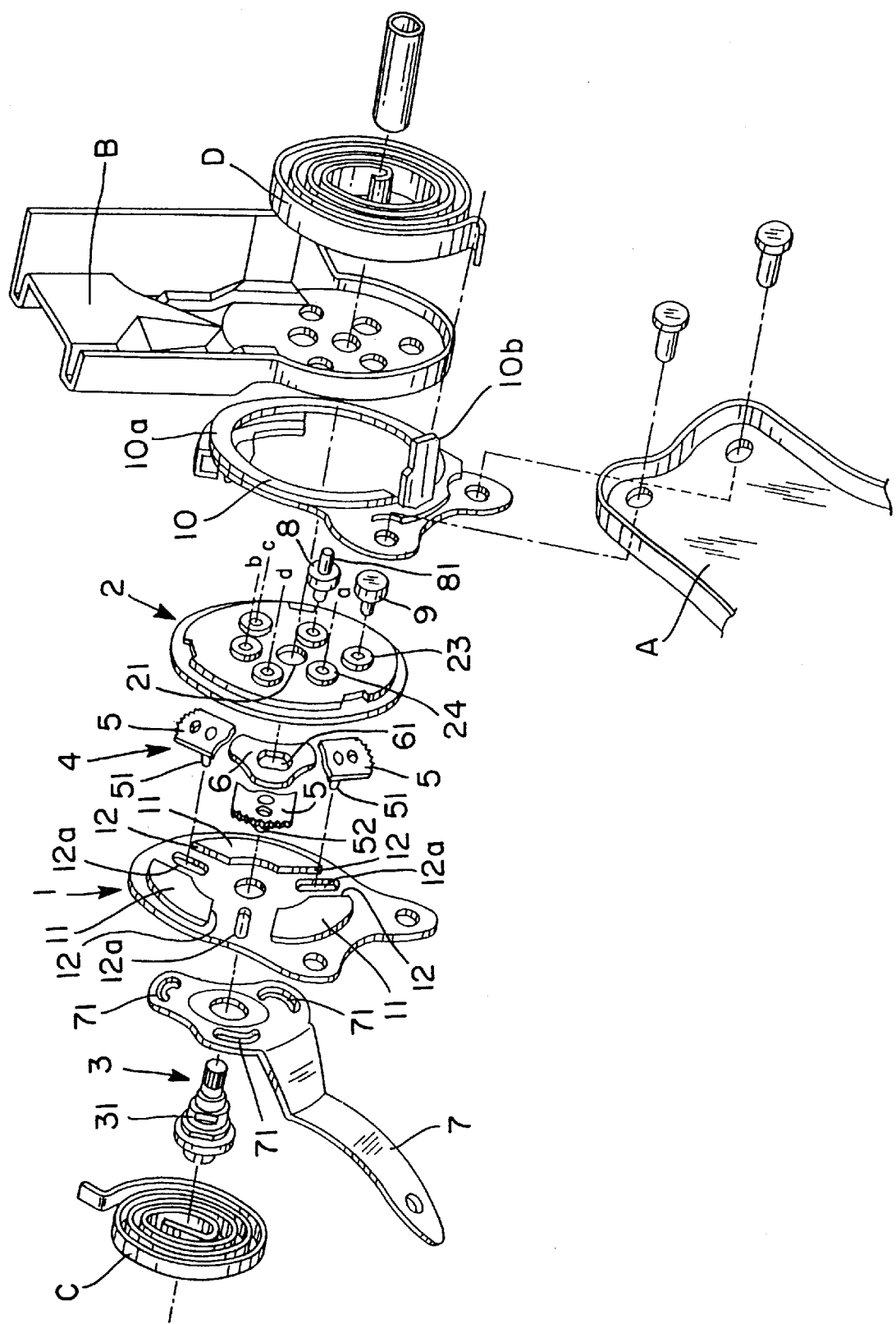
FIG. 1 is an exploded perspective view of a seat reclining mechanism in accordance with the present invention.
Figure 2:
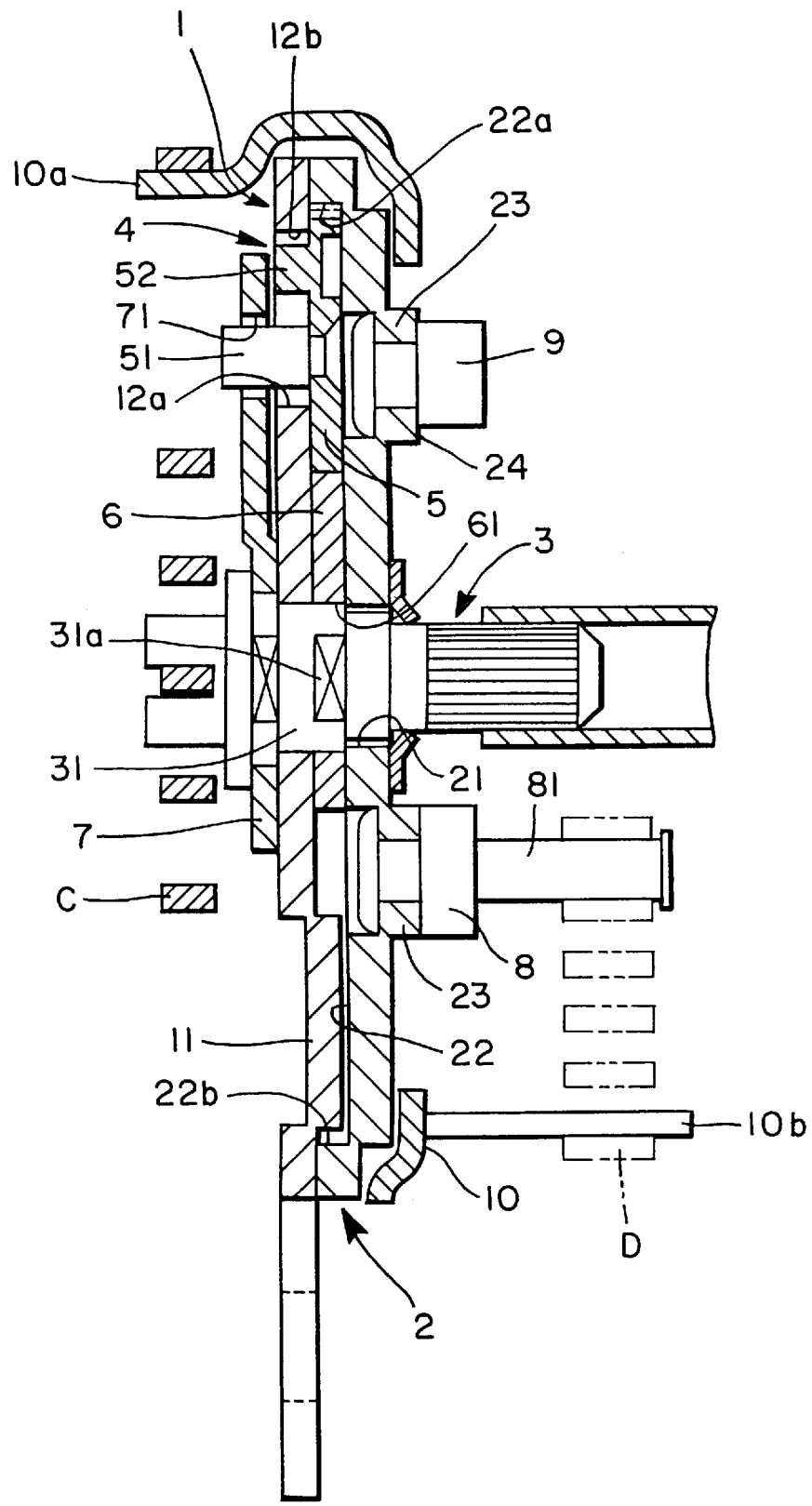
FIG. 2 is a vertical cross sectional view of the seat reclining mechanism in accordance with the present invention.

As shown in FIGS. 1 and 2, an upper arm 2 fixed to a seat back frame B of a seat assembly of an automobile is rotatably supported to a lower arm 1 fixed to a seat cushion frame A of the seat assembly. A rotation shaft 3 arranged on a center axis of a rotation of the upper arm 2 with respect to the lower arm 1 is rotatably supported to the lower arm 1. The rotation shaft 3 extends through a through hole 21 formed in the upper arm 2. In this case, the through hole 21 has a diameter larger than a diameter of the rotation shaft 3, and a slight gap is formed between the upper arm 2 and the rotation shaft 3. A lock mechanism 4 is positioned in the periphery of the rotation shaft 3 and arranged in a space between the lower arm 1 and the upper arm 2. A pipe fixed on the rotation shaft 3 extends toward the other side of the seat assembly to transmit a rotation torque applied to the rotation shaft 3 to a seat reclining mechanism arranged on the other side of the seat assembly.

The lock mechanism 4 is constituted by three pawls 5, which are circumferentially equally spaced and internal tooth portions 22a engaged with external tooth portions of each pawls 5 and disengaged therewith.

Figure 3:
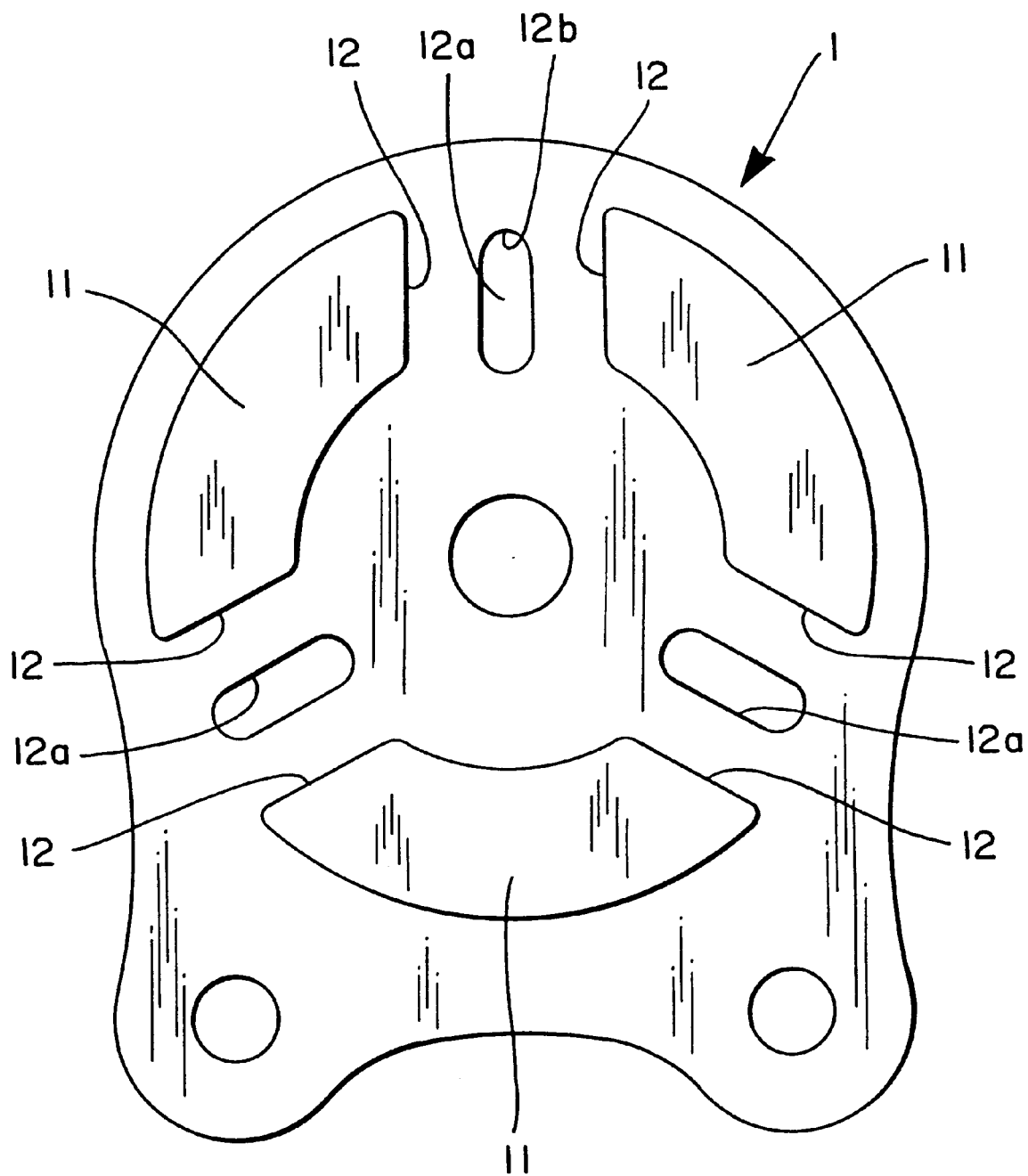
FIG. 3 is a plan view of a lower arm of the seat reclining mechanism in accordance with the present invention.
Figure 5:
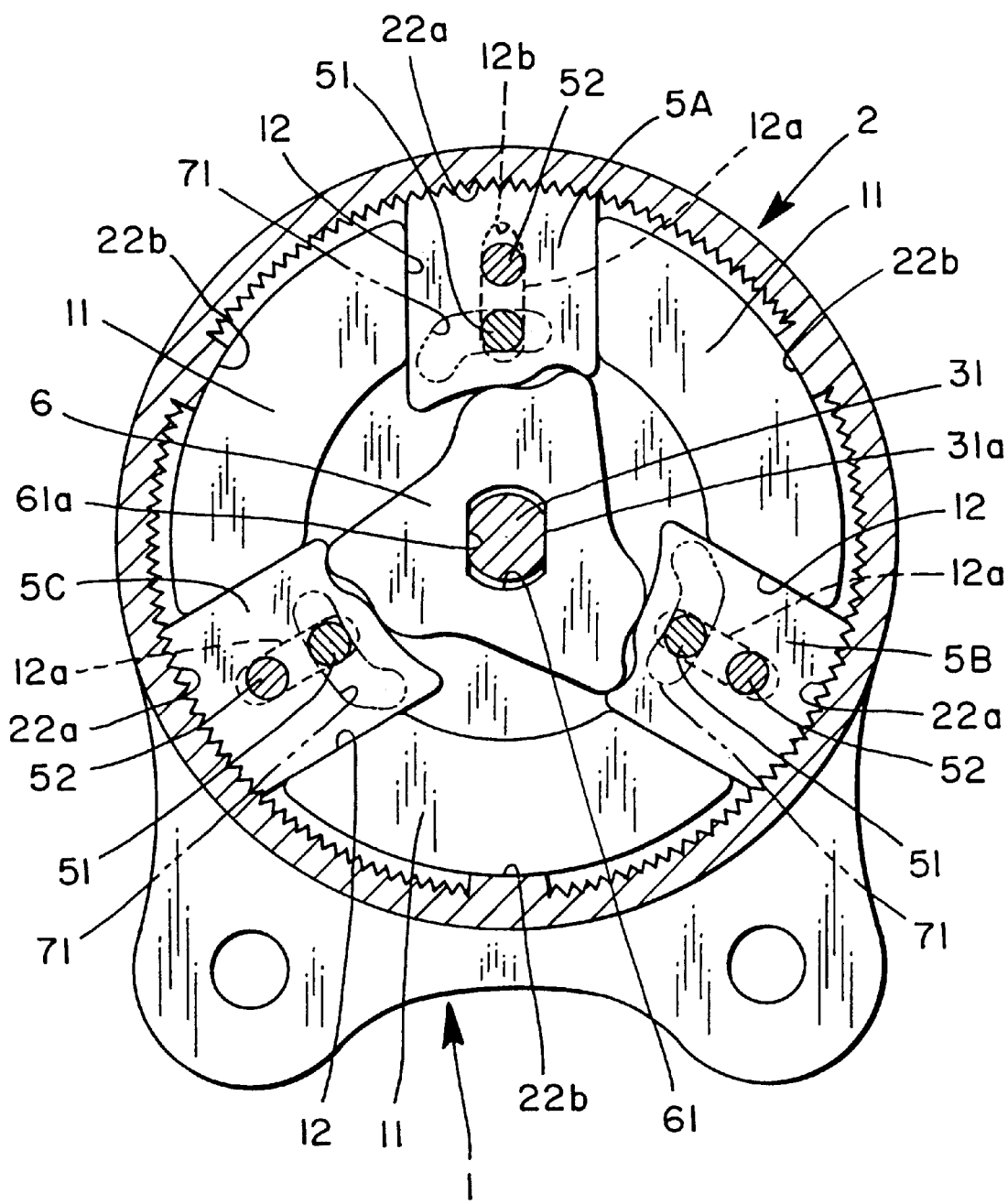
FIG. 5 is a plan view which shows a lock mechanism of the seat reclining mechanism in accordance with the present invention.

As shown in FIGS. 3 and 5, three convex portions 11 are formed on the lower arm 1 in a partial pressing manner so as to be projected toward the upper arm 2. Each of the convex portions 11 is formed in a fan shape extending in a circumferential direction around the rotation shaft 3, and is positioned on the same circumference so that an end surface of each convex portion 11 in the peripheral direction opposes to a peripheral end surface of the adjacent convex portion 11 in a spaced relation. Accordingly, three guide grooves 12 (in a radial direction of the rotation shaft 3) radially extending between the opposing peripheral end surfaces of the convex portions 11 are formed on the lower arm 1. Each guide grooves 12 are arranged substantially at a uniform interval in a peripheral direction around the rotation shaft 3. Each of the pawls 5 is arranged within each guide groove 12 and supported to the lower arm 1 in such a manner as to freely slide along the guide groove 12 in a radial direction.

Figure 4:
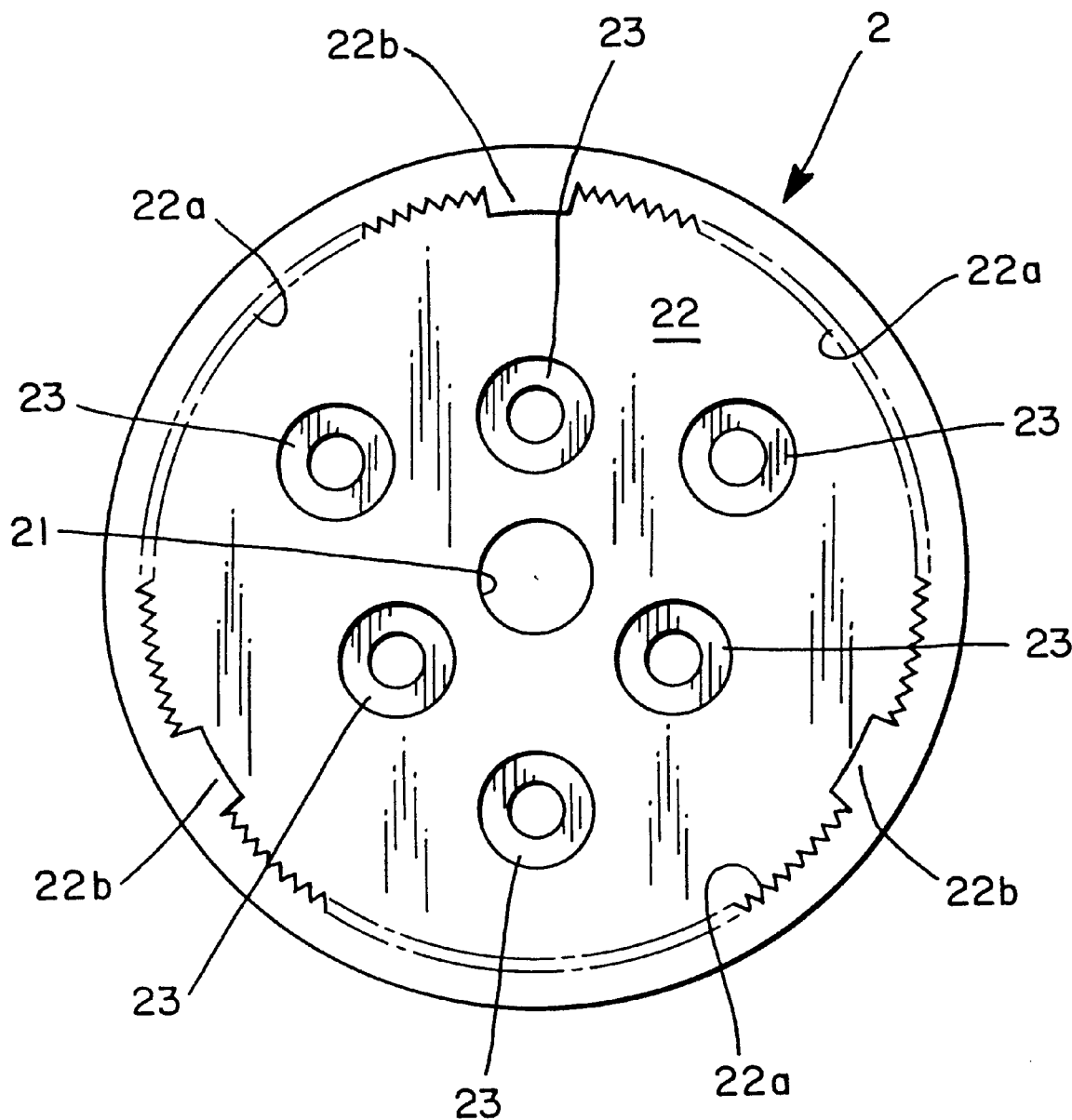
FIG. 4 is a plan view of an upper arm of the seat reclining mechanism in accordance with the present invention.

As shown in FIGS. 4 and 5, a recess portion 22 in a substantially regular circular shape is formed on a surface of the upper arm 2 in a side opposite to the lower arm 1 in a partial pressing manner and around the rotation shaft 3.

Internal tooth portions 22a engageable with the external tooth portions of the pawls 5 mentioned above and bearing portions 22b between the internal tooth portions 22a are integrally formed on the inner peripheral surface of the recess portion 22 by forming the recess portion 22.

In the structure mentioned above, as shown in FIG. 5, the convex portions 11 of the lower arm 1 are received within the recess portion 22 of the upper arm 2, and an outer peripheral surface of each convex portion 11 is slidably brought into contact with each bearing portion 22b. Accordingly, the upper arm 2 is rotatably supported to the lower arm 1. Further, the pawls 5 are opposed to the internal tooth portions 22a, and are arranged so as to engage with or disengage from the internal tooth portions 22a in accordance with a sliding operation of the pawls 5.

A support portion 31 having opposed flat surfaces 31a is formed on the rotation shaft 3, and a cam member 6 is supported to the supporting portion 31 so as to integrally rotate. The cam member 6 is arranged within the recess portion 22 so as to be brought into contact with inner surfaces of the three pawls 3, and press the pawls 5 in a direction of engaging with the internal tooth portion 22a by being brought into contact with the inner surfaces of the pawls 5. Further, a through hole 61 to which the rotation shaft 3 is inserted has a diameter slightly larger than a diameter of the supporting portion 31, and is provided with opposed flat surfaces 61a slidably brought into contact with the opposed flat surfaces 31a. The opposed flat surfaces 31a and 61a extend in a vertical direction in FIG. 5 so as to move toward a cam surface 12b mentioned below, and the cam member 6 is structured such as to integrally rotate together with the rotation shaft 3 and move with respect to the rotation shaft 3 by the opposed flat surfaces 31a and 61a.

An operation handle 7 is secured to the rotation shaft 3 in such a manner as to integrally rotate. Elongated holes 12a extending in a guide direction are formed in each guide groove 12 of the lower arm 1, and pins 51 passing through the holes 12a and extending toward the side of the operation handle 7 are extended from the pawl 5, respectively. Cam slots 71 are formed in the operation handle 7, which are circumferentially equally spaced, and the pins 51 of each pawls 5 are inserted into the cam slots 71, respectively. Accordingly, each pawl 5 can be slid along each guide groove 12 due to a cam operation between the pins 51 and the cam slots 71 so as to cancel an engagement between the pawl and the internal tooth portion 22a.

As shown in FIGS. 3 and 5, the cam surface 12b having an end gradually tapered is formed in one (disposed in an upper side in FIG. 5) of the elongated holes 12a. A protrusion 52 being in parallel to the pin 51 and inserted into the elongated hole 12a is formed in the pawl 5 in a partial pressing manner. The protrusion 52 (the protrusion 52 of the pawl 5A in an upper side in FIG. 5) inserted into the elongated hole 12a in which the cam surface 12b is formed can be brought into contact with the cam surface 12b, whereby the cam 6 member is moved with respect to the rotation shaft 3.

A plurality of boss portions 23 are formed in a wall constituting the recess portion 22 of the upper arm 2, which are circumferentially equally spaced. The upper arm 2 is mounted to the seat back frame B by two kinds of pins 8 and 9 inserted into the boss portions 23, and the front end surfaces of the boss portions 23 constitute mounting surfaces 24. In this case, the pin 8 is also mounted to portion a in FIG. 1, the pins 9 are mounted to portions b, c and d in FIG. 1, and the pin 8 is provided with a shaft portion 81 longer than that of the pin 9. The shaft portion 81 receives one end of a spring D.

A supporting plate 10 is arranged in a side of the mounting surface 24 of the upper arm 2. The supporting plate 10 is formed in a ring shape, and is commonly fastened together with the lower arm 1 and fixed to the seat cushion frame. A flange portion 10a covering a part of an outer peripheral edge of the upper arm 2 and extending to a side of the lower arm 1 is formed in the supporting plate 10. The flange portion 10a engages with the outer peripheral edge of the lower arm 1, whereby the upper arm 2 is held between the lower arm 1 and the supporting plate 10 so as to prevent the upper arm 2 from being removed from the lower arm 1 in an axial direction. The other end of the spring D is engaged with a projection 10b of the supporting plate 10.

In this case, a spring C arranged in a periphery of the rotation shaft 3 is provided between the supporting plate 10 and the rotation shaft 3 in a tensional manner, and rotates and urges the rotation shaft 3 so that the pawls 5 are pressed radially outwardly by the cam member 6 so as to be engaged with the internal tooth portion 22a. Further, the spring D as mentioned above is provided between the supporting plate 10 and the upper arm 2 in a tensional manner, and rotates and urges the upper arm 2 with respect to the lower arm 1.

Next, an operation will be described below.

All the pawls 5 are normally pressed by a contact between the cam member 6 and the radial inner surfaces of the pawls 5, whereby all the pawls 5 and the internal tooth portions 22a are engaged with each other so as to prevent the upper arm 2 from rotating with respect to the lower arm 1.

In this state, when the handle 7 is operated so as to rotate the rotation shaft 3 against the urging force of the spring C, the cam member 6 also rotates in a clockwise direction in FIG. 5 in an integral manner with the rotation shaft 3 and the all the pawls 5 are slid along the guide grooves 12 due to a cam effect between the cam slots 71 of the operating handle 7 and the pins 51 of the pawls 5. Accordingly, the engagement between all the pawls 5 and the internal tooth portions 22a is cancelled, the upper arm 2 receives the urging force of the spring D and is rotated with respect to the lower arm 1 due to a slidable contact between the bearing portions 22b and the convex portions 11.

When canceling the operation of the operation handle 7, the rotation shaft 3 receives the urging force of the spring C and rotates in an inverse direction to that mentioned above. Accordingly, all the pawls 5 are slid along the guide grooves 12 in an inverse direction due to the cam effect between the cam slots 71 of the operation handle 7 and the pins 51 of the pawls 5, and the cam member 6 rotates in an inverse direction so as to be brought into contact with the inner surfaces of the pawls 5, thereby pressing all the pawls 5. As a result, all the pawls 5 and the internal tooth portions 22a are again engaged with each other, so that the rotation between the upper arm 2 and the lower arm 1 is restricted.

At this time, the protrusion 52 of the pawl 5A is brought into contact with the cam surface 12b of the elongated hole 12 in the lower arm 1. Accordingly, the pawl 5A presses the cam member 6 due to the reaction force thereof, and move in a lower direction in FIG. 5 with respect to the rotation shaft 3. Accordingly, the back surfaces of the remaining pawls 5 (two pawls 5B and 5C in a lower side in FIG. 5) in which the cam surface 12b and the protrusion 52 are not brought into contact with each other are pressed, so that the pawls 5B and 5C are pressed in a direction of engaging with the internal tooth portion 22a in a stronger manner. As a result, the pawls 5B and 5C engage with the internal tooth portions 22a in a deeper manner, and press down the upper arm 2 through the engagement downwardly in FIG. 5, so that the pawl 5A and the internal tooth portion 22a are engaged with each other in a deeper manner. Accordingly, a play between the upper arm 2 and the lower arm 1 in a rotational direction can be securely restricted.

Further, in a state that the rotation between the upper arm 2 and the lower arm 1 is restricted by the engagement between the pawls 5 and the internal tooth portions 22a, when the load acts on the upper arm 2 from the seat back frame B, the load is received by a slidable contact between the bearing portions 22b and the outer peripheral surfaces of the convex portions 11 so as to be transmitted to the lower arm 1. Accordingly, the load does not act on the rotation shaft 3, so that a smooth rotation of the rotation shaft 3 can be secured.

In accordance with the invention, since the structure is made such that the cam surface brought into contact with one of the pawls is formed in the lower arm, and the other pawls are pressed through the cam member in an engaging direction of the ratchet, all the pawls and the ratchet can be more firmly engaged with each other in comparison with the related art, and a play between the pawls and the ratchet can be restricted in comparison with the related art.

As many apparently widely different embodiments of the present invention can be made without departing from the spirit and scope thereof, it is to be understood that the invention is not limited to the specific embodiments thereof except as defined in the appended claims.

What is claimed is:

1. A seat reclining mechanism comprising:
   a lower arm adapted to be mounted on a seat cushion frame;
   an upper arm rotatably mounted on said lower arm and adapted to be mounted on a seat back frame;
   a rotation shaft supporting the lower arm and extending through the upper arm;
   a lock mechanism comprising a ratchet and a plurality of pawls arranged between said lower arm and said upper arm and engageable with each other to restrict rotation of said upper arm with respect to said lower arm; and
   a cam member for moving said pawls into engagement with said ratchet, said cam member having a hole through which said rotation shaft extends so that said cam member is supported on said rotation shaft, said hole in said cam member being configured relative to said rotation shaft so that said cam member rotates integrally with said rotation shaft and is movable in a radial direction with respect to said rotation shaft;
   said lower arm being provided with a cam surface which is brought into contact with one of said pawls as said one pawl moves into engagement with said ratchet to cause said cam member to move in the radial direction and press the others of said pawls in a direction of engagement with said ratchet.

2. A seat reclining mechanism according to claim 1, further comprising a support portion having first opposed flat surfaces formed in said rotation shaft and extending toward said cam surface and supporting said cam member, and said hole in the cam member having second opposed flat surfaces that slidably contact said first surfaces.

3. A seat reclining mechanism according to claim 1, wherein said supporting portion is provided on said rotating shaft.

4. A seat reclining mechanism for vehicles comprising:
   a lower arm adapted to be secured to a seat cushion frame and having evenly spaced convex portions between which guide grooves are defined, the lower arm being provided with a plurality of elongated holes;
   an upper arm adapted to be secured to a seat back frame and having a depressed circular portion on which internal gear portions and bearing portions therebetween are formed and in which the convex portions of the lower arm are housed;
   a plurality of pawls each disposed in one of the guide grooves in a radially slidable manner and having an external gear portion engageable with each of the internal gear portions;
   a rotation shaft rotatably supported on the lower arm and having at least one flat surface;
   a cam member having a through hole with at least one flat and secured to the rotation shaft;
   a handle secured to the rotation shaft for rotating the cam member, the handle being provided with a plurality of cam slots; and
   means for restricting radial movement of one of the pawls when the pawls are radially outwardly moved along the guide grooves;
   the pawls each having a pin which axially extends through one of the elongated holes formed on the lower arm and one of the cam slots formed on the handle, each pawl being radially moved by a rotational movement of the cam member.

5. A seat reclining mechanism according to claim 4, wherein an axis or center line of one of the elongated holes formed on the lower arm is aligned with a center line between the opposed flat surfaces.

6. A seat reclining mechanism according to claim 4, wherein said means includes a projection formed on at least one of the pawls and inserted into the elongated hole of which an axis or center line coincides with a center line of the opposed flat surfaces of the rotation shaft, and a cam surface formed in said elongated hole having the abovementioned axis or center line to restrict further movement of the pawl in a radial and outward direction.

7. A seat reclining mechanism comprising:
   a lower arm adapted to be mounted on a seat cushion frame;
   an upper arm adapted to be mounted on a seat back frame, said upper arm being supported on said lower arm for relative rotational movement between the upper and lower arms;
   a rotation shaft on which the lower arm is mounted;
   a lock mechanism arranged between said upper arm and said lower arm to restrict rotational movement between said upper arm and said lower arm, said lock mechanism including a ratchet and a plurality of pawls that are engageable with each other; and
   a cam member mounted on the rotation shaft and rotatable together with said rotation shaft to contact the pawls and urge the pawls into engagement with the ratchet, said cam member being provided with a through hole that receives said rotation shaft, said through hole possessing a size which provides play between the rotation shaft and the cam member in a radial direction to allow the cam member to move in the radial direction relative to the rotation shaft;
   said lower arm being provided with a cam surface which is contacted by one of said pawls as said one pawl moves into engagement with said ratchet to cause said cam member to move in the radial direction and press another of said pawls in a direction of engagement with said ratchet.

8. A seat reclining mechanism according to claim 7, wherein said rotation shaft has at least one flat surface, said through hole in the cam member having at least one flat surface engaging the at least one flat surface on said rotation shaft.

9. A seat reclining mechanism according to claim 7, wherein said rotation shaft has a pair of flat surfaces, said through hole in the cam member having a pair of flat surfaces that each engage one of the flat surfaces on said rotation shaft.

* * * * *